Aug. 31, 1943.        S. N. HEDMAN        2,328,451
ELASTIC FLUID TURBINE ARRANGEMENT
Filed July 3, 1941
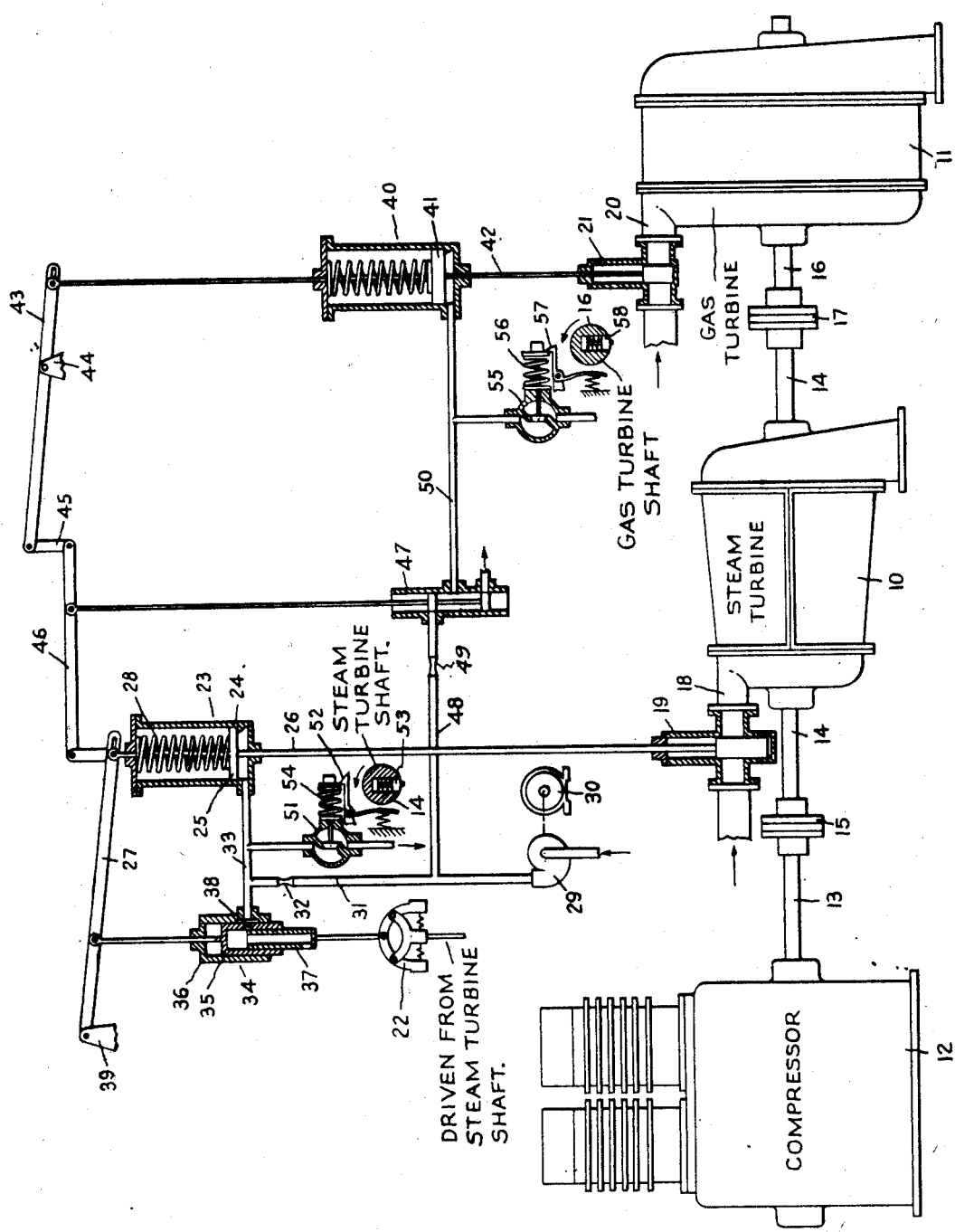
Inventor:
Sverker N. Hedman,
by *Harry E. Dunham*
   His Attorney.

Patented Aug. 31, 1943

2,328,451

UNITED STATES PATENT OFFICE 2,328,451

ELASTIC FLUID TURBINE ARRANGEMENT

Sverker N. Hedman, Stoneham, Mass., assignor to General Electric Company, a corporation of New York Application July 3, 1941, Serial No. 400,904

4 Claims. (Cl. 60—6)

The present invention relates to elastic fluid turbine arrangements of the kind including two elastic fluid turbines or prime movers mechanically connected to drive a common load and arranged to receive elastic fluid from different sources of supply. It is often desirable in an arrangement of this kind to utilize to the fullest extent one source of supply and to use the other source only when needed to carry excess load. The invention is of particular interest in connection with arrangements in which a gas turbine and a steam turbine are both mechanically connected to drive a compressor or other load when it becomes desirable fully to load the gas turbine before starting to load the steam turbine. This is accomplished by the provision of a governing mechanism for controlling the supply of elastic fluid to the turbines.

The object of my invention is to provide an improved construction and arrangement of turbine governing mechanisms to control the flow of elastic fluid to a plurality of turbines or prime movers.

For a consideration of what I believe to be novel and my invention, attention is directed to the following description and the claims appended thereto in connection with the accompanying drawing.

The drawing shows a diagrammatic view of an elastic fluid turbine arrangement embodying my invention.

The arrangement shown in the drawing comprises two elastic fluid turbines or prime movers, a steam turbine 10 and a gas turbine 11 for driving a common load such as a compressor 12 having a shaft 13. The steam turbine 10 has a shaft 14 connected by a coupling 15 to the compressor shaft 13 and the gas turbine 11 has a shaft 16 mechanically connected by a coupling 17 to the turbine shaft 14. The steam turbine 10 is provided with an inlet conduit 18 and a control or throttle valve 19 for controlling the flow of steam or like elastic fluid from a source (not shown) to the turbine. Similarly, the gas turbine 11 is provided with an inlet conduit 20 including a control or throttle valve 21 for controlling the flow of operating gas from a source of gas (not shown) to the gas turbine.

As stated above, in certain installations it is desirable fully to load the gas turbine before the steam turbine is loaded, in other words, to carry the load primarily by the gas turbine and to operate the steam turbine only to carry excess load or upon failure of the gas turbine.

This is accomplished in accordance with my invention by the provision of an improved governing mechanism for operating the throttle valves 19, 21 of the steam turbine 10 and the gas turbine 11 respectively.

The governing mechanism includes an element or device responsive to changes of an operating condition of the turbine arrangement. In the present example I have shown such condition responsive element in the form of a speed governor 22 driven from the steam turbine shaft for controlling the valves 19, 21 in response to speed changes of the turbine arrangement. The speed governor 22 is connected to the valves through the intermediary of power relays or servomotors including a main hydraulic motor 23 having a cylinder 24 with a piston 25 movably disposed therein and connected by a stem 26 to the valve 19 and to the right hand end of a follow up lever 27. The piston 25 is biased in downward direction by a compression spring 28. Operating fluid such as oil under pressure is supplied to the lower end of the cylinder 24 from a source of operating fluid (not shown) by means of a pump 29, in the present example driven by an electric motor 30. The pump has a discharge conduit 31 with an orifice 32 connected to a pipe 33 which at its right hand end communicates with the pressure chamber of the motor 23 and at its left hand end is connected to a control or pilot valve 34 for controlling the fluid pressure in the motor 23.

The pilot valve 34 has a bushing 35 slidably disposed in a casing 36 and with its upper end pivotally connected to an intermediate point of the lever 27. A hollow valve member or sleeve 37 is slidably disposed within the bushing 35 and connected at its lower end to the flyweights of the speed governor 22. The bushing 35 forms a port 38 which during normal operation establishes communication between the conduit 33 and the upper end of the hollow sleeve 37. Thus, during normal operation operating fluid is continuously discharged from the pump 29 through the pipe 33 and the pilot valve 34. The fluid pressure in the pipe 33 and accordingly in the pressure chamber of the hydraulic motor 23 depends upon and is varied by changes of the relative position between the bushing 35 and the sleeve 37 of the pilot valve. The sleeve 37 normally uncovers partly the port 38. If the sleeve 37 moves downward in response to increasing speed, it uncovers more of the port and the pressure in the hydraulic motor 23 decreases and, vice versa, if the sleeve 37 moves upward in response to decreasing turbine speed the pressure in the hydraulic motor 23 increases. Increasing fluid pressure in the hydraulic motor 23 causes upward movement of the piston 25 resulting in opening movement of the turbine valve 19 and counterclockwise turning movement of the lever 27 about its left hand end which in the present example, is supported on a fixed fulcrum 39. Upward movement of the lever 27 causes similar movement of the bushing 35 whereby the latter is restored to its original position relative to the sleeve 37.

During starting and during increasing load demand, the piston 25 of the hydraulic motor 23 is moved upward to cause movement of the steam turbine valve 19 in opening direction. The valve 19, however, will be opened only after the valve 21 has reached its fully opened position. To this end, the steam turbine valve 19 is provided with overtravel in closing direction corresponding to the effective stroke of the gas turbine valve 21.

The valve 21 is operated in response to movement of the hydraulic motor 23, which latter may be termed the main hydraulic motor, through the intermediary of another or auxiliary hydraulic motor 40 similar in design to the main hydraulic motor 23 and including a piston 41 having a stem 42 secured at its lower end to the valve 21 and pivotally connected at its upper end to the right hand end of a lever 43. An intermediate point of the lever 43 is supported on a fulcrum 44 and the left hand end of the lever 43 is connected by a link 45 to the right hand end of a floating lever 46. The left hand end of the floating lever 46 is pivotally connected to the upper end of the stem 26 of the main hydraulic motor 23 and an intermediate point of the floating lever 46 is pivotally connected to a pilot or control valve 47 for controlling the flow of operating fluid from the pump 29 to the auxiliary motor 40. The pilot valve 47 is connected by a pipe 48 including an orifice or restriction 49 to the pump 29 and by a pipe 50 to the pressure chamber of the motor 40.

During operation upward movement of the piston 25 of the main hydraulic motor 23 in response to a decrease in turbine speed causes clockwise turning movement of the lever 46 about its right hand end whereby the pilot valve 47 for the auxiliary hydraulic motor 40 is moved upward and admits operating fluid under pressure from the pipe 48 through the pilot valve and the pipe 50 to the pressure chamber of the auxiliary hydraulic motor 40. This causes upward movement of the piston 40, thus effecting opening movement of the gas turbine valve 21. Upward movement of the piston 41 at the same time causes counterclockwise turning movement of the follow up lever 43 about the fulcrum 44 whereby the lever 46 is turned downward about its left hand end and restores the pilot valve 47 to its normal or original position in which its valve heads cover its ports.

Upon an increase in speed, the piston of the main hydraulic motor 23 is moved downward thereby effecting through its connection with the lever 46 downward movement of the pilot valve 47 to permit the discharge of operating fluid from the pressure chamber of the hydraulic motor 40. This causes downward movement of the piston 41 resulting in closing movement of the gas turbine valve 21 and through the connection of the piston 41 with the follow up lever 43 causing restoring of the normal or line in line position of the pilot valve 47.

During starting, the steam turbine valve 19 due to its overtravel in closing direction will open only after the gas turbine valve 21 has reached its fully open position. If during such condition the load increases, the valve 19 opens and admits steam to the turbine 10. At the same time, the gas turbine valve 21 continues to move in opening direction without changing its effective opening area upon increasing load demand. To this end, the gas turbine valve is provided with overtravel in opening direction equal to the full effective stroke of the steam turbine valve 19.

Summarizing, the steam turbine valve 19 has overtravel in closing direction and the gas turbine valve 21 has overtravel in opening direction. Any change in operating condition such as load or speed causes through the governing mechanism movement of both valves. With increasing load the steam turbine valve opens only after the gas turbine valve has reached its fully open position and vice versa with decreasing load, the gas turbine valve closes only after the steam turbine valve is shut.

Another important feature of my invention is the provision of two emergency trip valve mechanisms, one operated from the gas turbine and another operated from the steam turbine and arranged to render inoperative the gas turbine only upon failure of or during emergency conditions of the gas turbine and another arranged to render inoperative both turbines, that is, the entire turbine or prime mover arrangement, upon failure or during emergency of the steam turbine.

More specifically, the emergency governing mechanism comprises a trip valve 51 connected to the pipe 33. The valve is normally held in closed position by means including a latch 52 arranged in cooperative relation with a known type emergency speed governor 53 connected to and driven by the steam turbine shaft 14. During emergency condition, that is in the present example, upon the occurrence of a predetermined maximum speed, the fly weight of the emergency governor 53 engages and releases the latch 52 whereupon the valve 51 is forced open by the action of a biasing spring 54 to cause draining of operation fluid from the main hydraulic motor 23. This causes movement of the piston 25 into its lower end position whereby both the steam turbine valve 19 and the gas turbine valve 21 are shut, the valve 19 being directly shut by the main hydraulic motor 23 and the valve 21 being indirectly shut by the resulting action on the pilot valve 47 moving in a downward direction and allowing the oil from the auxiliary hydraulic motor 40 to escape through the oil passage 50 through the pilot valve to the drain connection.

The emergency governing mechanism for the gas turbine 11 comprises a trip valve 55 connected to the pipe 50 and normally held in closed position against the biasing force of a spring 56 by a latch 57. The latch 57 is cooperatively associated with a known type emergency speed governor 58 held on and driven by the gas turbine shaft 16.

If during operation the gas turbine speed reaches emergency magnitude as may occur upon failure of the coupling 17, the fly weight of the governor 58 releases the latch 57 and causes the trip valve 55 to be forced open by action of the compression spring 56. Operating fluid is then drained from the auxiliary hydraulic 40 through the trip valve and the gas turbine valve 21 is shut. Failure of the gas turbine especially when caused by failure of the coupling 17 does not interrupt operation of the steam turbine 10 and the compressor 12. If during failure of the gas turbine the steam turbine valve 19 was shut, it will be subsequently opened by operation of the main hydraulic motor 23 and the speed governor 22 and in case the steam turbine valve 19 was partly opened during failure of the gas turbine, it will be further or fully opened in response to such failure by action of the speed governor 22 and the main hydraulic motor 23.

In a preferred embodiment of my invention, the gas turbine emergency trip valve mechanism is adjusted to operate at a lower speed than the emergency trip valve mechanism of the steam turbine. With such arrangement, the gas turbine may be shut or disconnected from its source of supply upon failure of the gas turbine governing mechanism. The steam turbine, however, will continue to operate and carry the load or be disconnected in case of complete failure of the turbines.

If during operation the gas turbine emergency trip valve mechanism becomes inoperative or in case the gas turbine inlet valve becomes stuck, the speed of the turbine arrangement will increase until the emergency trip valve mechanism of the steam turbine is operated to cause shut down of the entire turbine arrangement.

In certain plants in which the source of gas becomes available only during operation of the compressor and no gas is available during starting, the steam turbine in addition to its function of carrying overload also serves for starting the compressor.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. The combination of a compressor having a shaft, a steam turbine having an inlet valve and a shaft coupled at one end to the compressor shaft, a gas turbine having an inlet valve and a shaft coupled to the other end of the steam turbine shaft, a hydraulic governing mechanism including a single speed governor driven from the steam turbine shaft for operating both valves and arranged to cause opening of the steam turbine valve only after the gas turbine valve is fully open and closing of the gas turbine valve after the steam turbine valve is shut, an emergency speed governing mechanism including an emergency speed governor driven from the steam turbine, and another emergency speed governor driven from the gas turbine shaft and set to operate at a speed below that of the first mentioned emergency speed governing mechanism.

2. An elastic fluid turbine arrangement including a first turbine having an inlet conduit with a throttle valve having overtravel in closing direction, a second turbine with a shaft mechanically connected to the shaft of the first turbine and having an inlet conduit with a valve having overtravel in opening direction, a governing mechanism for controlling the valves comprising a device responsive to changes of an operating condition of the turbines indicative of the load thereon, a hydraulic motor connected to the first valve, a control member connected to the device for controlling the hydraulic motor, and means including another hydraulic motor connected to the second valve for relaying movement of the first motor to the second valve.

3. An elastic fluid turbine arrangement including first and second turbines having shafts mechanically coupled together and inlet conduits with a first control valve for the first turbine and a second control valve for the second turbine, the first control valve being arranged to permit overtravel in closing direction equal to the full effective stroke of the second control valve and the second control valve being arranged to permit overtravel in opening direction equal to the full effective stroke of the first control valve, and a governing mechanism for controlling the valves comprising a speed governor driven from one of the shafts, a pilot valve connected to the speed governor, a main hydraulic motor controlled by the pilot valve and having a piston connected to the first turbine valve, and means including an auxiliary hydraulic motor connected to the second turbine valve for moving the second turbine valve in response to movement of the main hydraulic motor.

4. An elastic fluid turbine arrangement including first and second turbines having shafts mechanically coupled together and inlet conduits with a first control valve for the first turbine and a second control valve for the second turbine, the first control valve being arranged to permit overtravel in closing direction and the second control valve being arranged to permit overtravel in opening direction, and a governing mechanism for controlling the valves comprising a single governor responsive to changes of an operating condition of the turbines indicative of the load thereon, a pilot valve connected to the governor, a main hydraulic motor controlled by the pilot valve and having a piston connected to the first turbine valve, means including an auxiliary hydraulic motor connected to move the second turbine valve in response to movement of the main hydraulic motor, an emergency governing mechanism connected to the auxiliary motor to effect closing of the second turbine valve in response to a predetermined operating condition of the second turbine and another emergency governing mechanism connected to the main hydraulic motor to effect closing of both turbine valves in response to a predetermined operating condition of the first turbine.

SVERKER N. HEDMAN.